April 17, 1934.  C. C. GATES  1,955,581
BELT MEASURING MACHINE
Filed Dec. 4, 1931   2 Sheets-Sheet 1
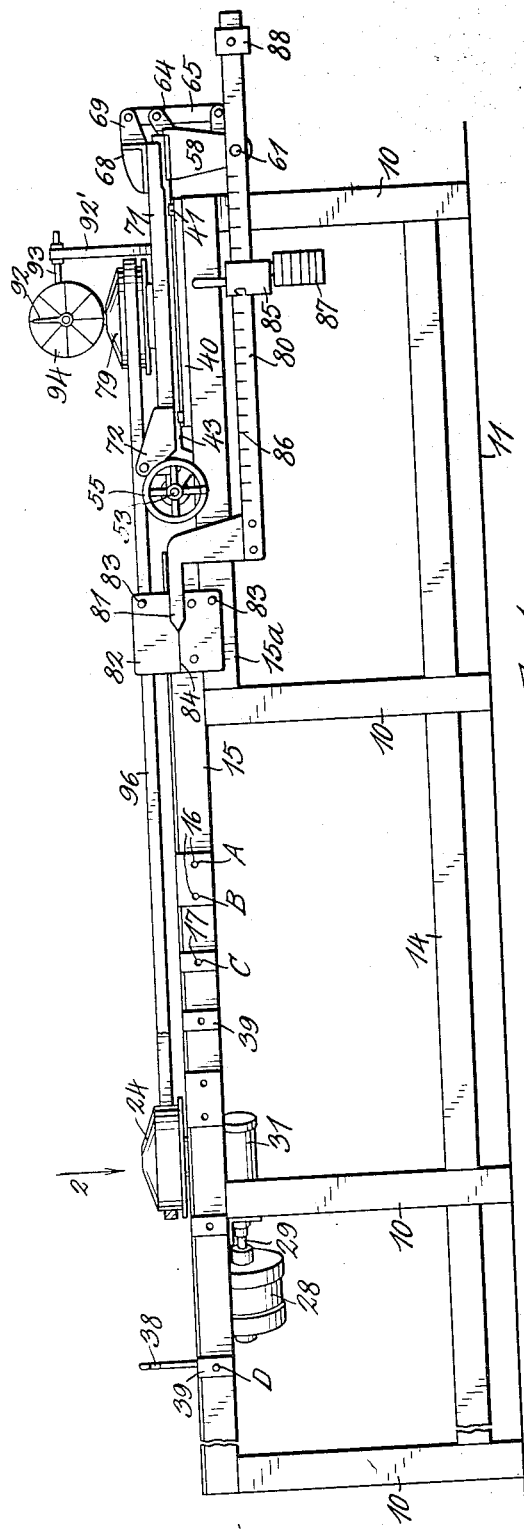
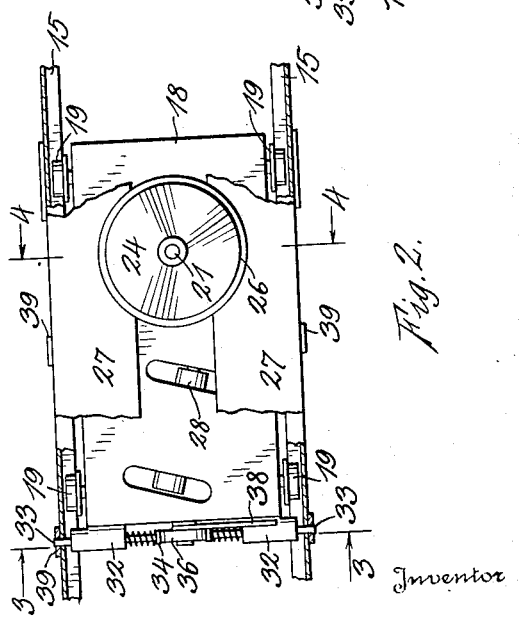
Inventor
Charles C. Gates.
By A. J. O'Brien
Attorney April 17, 1934.  C. C. GATES  1,955,581

BELT MEASURING MACHINE

Filed Dec. 4, 1931  2 Sheets-Sheet 2

Inventor
Charles C. Gates.
By A. J. O'Brien
Attorney

Patented Apr. 17, 1934

1,955,581

UNITED STATES PATENT OFFICE 1,955,581

BELT MEASURING MACHINE

Charles C. Gates, Denver, Colo.

Application December 4, 1931, Serial No. 579,064

5 Claims. (Cl. 265—1)

This invention relates to improvements in machines for testing belts and has reference more particularly to a machine for testing and comparing the lengths of V-shaped belts.

It is becoming increasingly prevalent to employ for power transmission grooved pulleys and V-shaped belts, and in many cases a number of these belts are employed in parallel and it is therefore necessary to be able to determine quite accurately the lengths of these belts so that belts of the same length can be selected for use on the same transmission. It is apparent that where several belts are employed in parallel, if they were of different lengths, they would not properly cooperate and therefore their power transmission properties would not be as satisfactory as when belts of just the right length were used.

It is the object of this invention to produce a simple and substantial machine by means of which belts can be tested as to length while running under a predetermined tension which corresponds to the tension to which they will be subjected when in actual use.

Another object of this invention is to produce a machine of the type specified that shall be so constructed that each belt can be tested quickly and at the same time accurately and in which the parts are so arranged that a belt can be removed and another one replaced with a minimum amount of labor.

The above and other objects that may become apparent as this description proceeds are attained by means of a construction and an arrangement of parts that will now be described in detail, and for this purpose reference will be had to the accompanying drawings in which the preferred embodiment of the invention has been ilustrated, and in which:

Fig. 1 is a side elevation of the machine;

Fig. 2 is a view looking in the direction of arrow 2 in Fig. 1, parts of the machine being broken away to better disclose the construction;

Fig. 3 is a section taken on line 3—3, Fig. 2;

Fig. 4 is a section taken on line 4—4, Fig. 2;

Figures 6, 7:
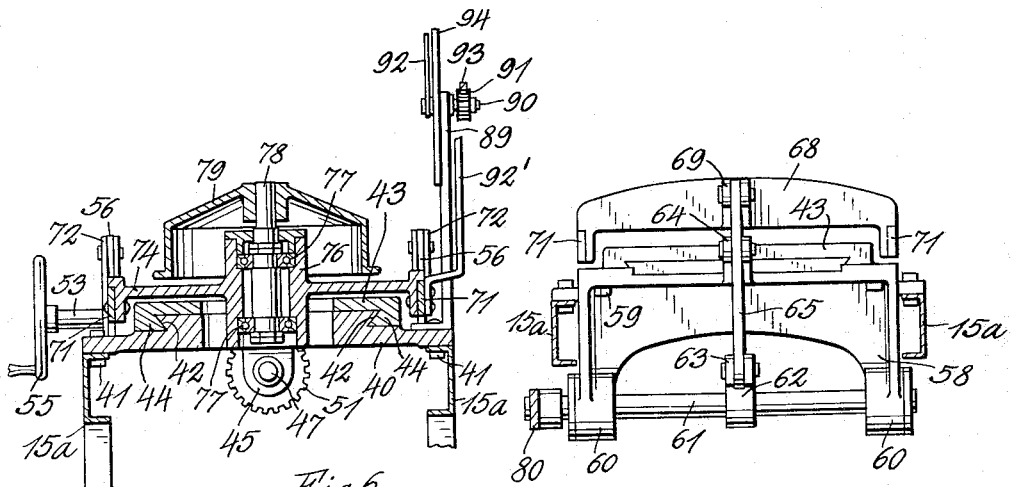
Fig. 6 is a section taken on line 6—6, Fig. 5.
Fig. 7 is a view looking in the direction of arrow 7, Fig. 5.

The machine consists of a framework having a number of pairs of vertical supports 10, whose lower ends rest on the supporting surface 11. The supports are connected at their lower ends by means of transverse channel irons 12 and are also connected intermediate their ends by means of similar channel irons 13. Extending lengthwise of the frame and connecting the several pairs of supports are channel irons 14. The upper ends of the supports have channel iron side members 15 electrowelded to them in the manner shown in Fig. 6. The top frame members 15 are provided with spaced openings 16 and 17. The function of these openings will be explained hereinafter.

Referring now to Fig. 1 it will be seen that the two pairs of vertical supports at the right hand end of the frame ar connected by channel irons 15a that are located below the corresponding channl irons 15 and the upper surfaces of the side members 15a are therefore lower than the upper surfaces of members 15 by an amount equal to the width of the channel iron. Carried by the side members 15 is a bearing block 18. This may be made from cast iron and is provided on opposite sides with flanged wheels 19 that are adapted to rest on the lower flanges of the side supports 15. Bearing block 18 has a central hub 20 which is perforated and in which a shaft 21 is mounted for rotation. This shaft is journaled in suitable ball bearings 22 and is provided at its lower end with a worm wheel 23. Secured to the upper end of the shaft is a pulley 24. This pulley has a driving face 25 and a flange 26 at its lower end. Secured to the upper flanges of the channel irons 15 are plates 27 that extend inwardly towards the center of the frame in the manner shown in Fig. 4. Supported by the block 18 and located underneath the same is a motor 28. The drive shaft of this motor has been designated by the reference numeral 29 and is provided with a worm 30 that engages the worm wheel 23 in the manner shown in Fig. 4. The worm drive is enclosed in a housing 31. When the motor is operating the pulley 24 will be rotated in a manner quite apparent from the drawings. One end of block 18 is provided with two spaced bearings 32 in which are slidably mounted plungers 33. The inner ends of these plungers are provided with heads 34 and a coil spring 35 is located between each head and the adjacent end of the bearing 32. A cam 36 is mounted for rotation on a pivot 37 and has attached to it a handle 38 and when this cam is in the position shown in Fig. 3, the plungers will be forced outwardly so as to project through holes 16 or 17 in the frame members 15. By means of the plungers, bearing block 18 can be securely connected to the frame at any predetermined point. Plates 39 are secured to the outer surface of members 15 at points where holes 16 and 17 are, so as to reenforce the material at this point. The several sets of holes 16 and 17 are designated in some appropriate manner so as to identify them with belts of a particular length and in Fig. 1 some of these holes have been designated by letters A, B, C and D.

At the other end of the frame and supported by the channels 15a is a cast iron block 40. This supporting block is held in place by means of bolts 41 and is provided on its upper surface with two parallel upwardly and outwardly inclined surfaces 42 that form part of a dovetail sliding connection that will be shortly referred to.

Figure 5:
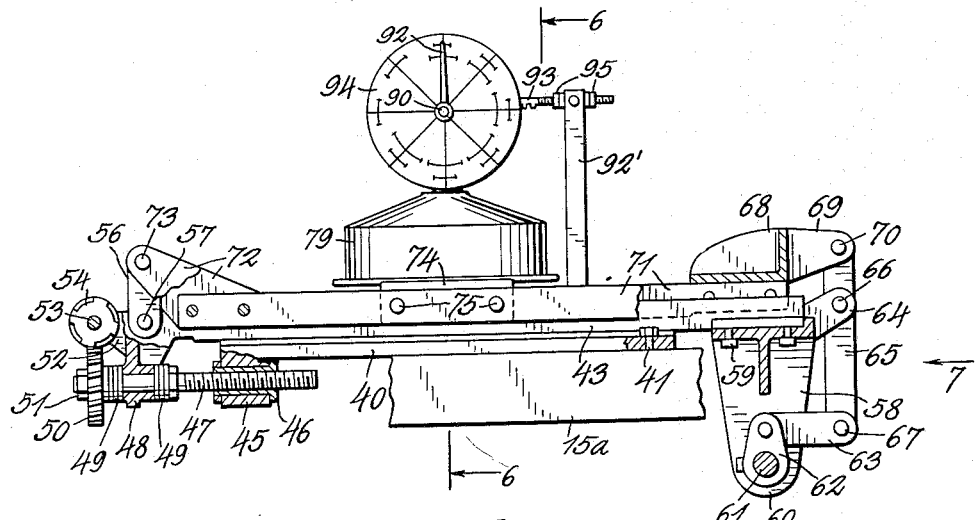
Fig. 5 is a view partly in section and partly in elevation showing the support and bearing block for one of the pulleys.

Carried by the block 40 is a supporting block 43 that is provided along its sides with downwardly extending portions 44 whose inner surfaces are inclined so as to cooperate with the inclined surfaces 42. The support 43 can be moved along the block 40 in a manner quite apparent from an inspection of Figs. 5 and 6. One end of block 40 is provided with a downwardly extending lug 45 within which is located a threaded bushing 46. A screw 47 extends through this bushing and has a threaded connection therewith in the manner shown in Fig. 5. The end of block 43 adjacent the lug 45 on block 40 is provided with a downwardly extending lug 48 that has an opening through which the screw 47 passes. Thrust bearings 49 are located on each side of the lug 48 and secured to the outer end of the screw is a spiral gear 50. This gear may be held in place by means of a nut 51 or other suitable means. Block 43 is also provided with two lugs 52, one of which is located near each side thereof and mounted for rotation in these lugs is a shaft 53. A spiral gear 54 is attached to this shaft and on the outer end of the shaft a hand wheel 55 is provided. By rotating the hand wheel and the shaft 53 the screw 47 is rotated through the interaction of the spiral gears and in this way block 43 is moved with respect to block 40. Extending upwardly from opposite sides of the block 43 at the end where lugs 52 are located are two links 56 whose lower ends are connected to the block 43 by means of pivots 57. At the opposite end of block 43, two brackets 58 are secured by bolts 59. These brackets extend downwardly and are provided with bearings 60 in which a shaft 61 is journaled. This shaft is provided with a crank arm 62 to the upper end of which a short link 63 is pivoted. Extending rearwardly from the connecting portion of brackets 58 are two spaced lugs 64 between which a lever 65 is located. A pivot 66 extends through the two lugs 64 and through the lever 65. The lower end of lever 65 is connected to the free end of link 63 by means of a pivot 67. A casting 68 has two rearwardly extending lugs 69 between which the upper end of the lever 65 is located and to which it is connected by means of a pivot 70. Secured to the ends of the casting 68 are steel bars 71, whose front ends are connected by means of another casting having upwardly extending lugs 72 that are attached to the upper ends of links 56 by pivot pins 73. It is apparent now that the assembly comprising members 68, 71 and 72 is suspended from the block 43 by means of the links 56 and that part of lever 65 that lies between the pivot points 66 and 70. If the bars 71 are moved relative to the block 43, shaft 61 will be turned about its axis through an angle corresponding to the extent of this movement. The rotation of shaft 61 will be referred to hereinafter.

A bearing block 74 is connected at its ends to the bars 71 by means of rivets or bolts 75. Bearing block 74 is provided with a central tubular hub 76, which, in turn is provided adjacent its top and bottom with ball bearings 77. A shaft 78 is journaled in the bearing 77 and secured to the upper end of this shaft is a pulley 79 that corresponds in size and shape with pulley 24 referred to above.

Referring now more particularly to Fig. 1, it will be seen that a scale beam 80 has been attached to the outer end of shaft 61 so that whenever this shaft is turned about its axis the scale beam will be rocked. The free end of the scale beam is provided with a pointer 81 that moves over a plate 82 that is provided with two spaced stops 83 which limit the up and down movement of the pointer. A line 84 designates the position that the pointer should occupy when the scale beam is in balance. A weight 85 is slidably secured to the scale beam and the latter is provided with graduations 86. A number of removable weights 87 are secured to the under side of the weight 86. For the purpose of balancing the parts, a counter weight 88 is provided.

Extending upwardly from the upper surface of block 40 is a standard 89 to the upper end of which a short shaft 90 is journaled. One end of shaft 90 has a small gear wheel 91 and the other end is provided with a pointer 92. Attached to one of the bars 71 is an upwardly extending member 92' to the upper end of which a rack 93 is attached. This rack has teeth that cooperate with the gear 91 and therefore when the member 92' moves towards or away from member 89, shaft 90 will be turned and this, in turn, will move the pointer 92. A circular plate 94 is attached to the standard 89 and one side of this plate is provided with graduations like those shown in Fig. 8. This plate is rotatable about its center so as to bring any sets of graduations to any predetermined position.

Figure 8:
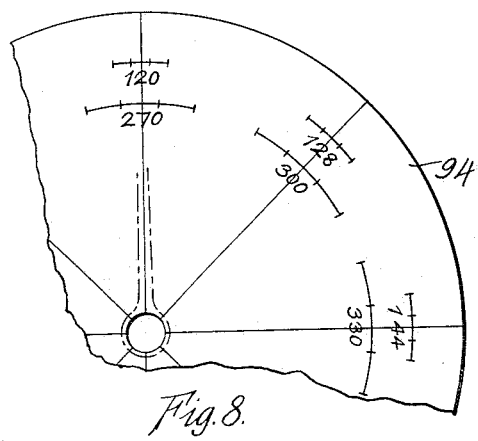
Fig. 8 is a fragmentary view showing a circular scale employed in connection with the machine.

Referring now to Fig. 8 it will be seen that disk 94 is provided with a number of sets of graduations; in the example shown one of these sets has been indicated by number 120 and another by number 270. Each set of these graduations corresponds to a certain length of belt and a certain type and the machine is so adjusted that when the belt is exactly the proper length for its type, the pointer will coincide with the radial line when the belt is operating at the prescribed tension. If the belt is slightly shorter or longer, the pointer will move to one side or the other of the radial line and the short arc with the three spaces marked off thereon indicates the permissible tolerance for the particular belt. As long as the pointer stays within the limits of this arc, the belt is of the proper length, but if it passes beyond the ends of the arc then it is put aside and may be matched with other belts of the same length.

Since this machine is intended for testing belts of different lengths and different types, the disk 94 is provided with a large number of these graduations, each corresponding to a type of belt that is being manufactured but for the purpose of this explanation only a few of these graduations have been shown as it is not necessary to go into details as to the large number of types of belts made. The rack 93 can be adjusted longitudinally by means of nuts 95 so as to get the proper adjustment for any particular belt.

Let us now assume that the machine has been constructed in the manner described and it is desired to test a belt 96 while operating under a given tension. The pulley 24 is first adjusted to the particular opening in the side members corresponding to that particular type of belt after which the weight 85 is adjusted on the scale beam to the tension desired. Motor 28 is now started and a belt applied to the pulleys as shown in Fig. 1. While the motor is operating and turning the pulleys, hand wheel 55 is rotated so as to adjust the tension of the belt to such a value that the pointer 81 is in line with graduation mark 84. The position of pointer 92 is now observed and if this is within the limits of the graduations which determine the tolerance for that particular belt, the belt is considered to be of the proper length. But, if the variation is greater than that permitted, the belt is put aside as not being of the proper length for the group to which it belongs.

When belts of a different length are to be tested, the position of the pulley 24 is first adjusted to the opening corresponding to this particular belt and the disk 94 is turned so as to bring the proper graduations into the correct position for testing this length of belt.

From the above description it will be seen that by means of this simple machine, belts can readily be tested while operating under a given tension and in this way it is possible to match belts for use in transmissions employing a plurality of belts in parallel. In the illustration a thick narrow belt has been shown, but this machine can also be used for testing belts of any shape, although where flat belts are employed, the variations in length are not so important for the reason that flat belts are seldom employed in parallel in the way in which V-shaped belts are used.

In the machine illustrated certain specific details have been shown and the same have been described in the specification, but this is merely for the purpose of properly describing the operation and preferred construction and applicant is aware that it is possible to obtain the same results with constructions that differ from the specific construction described and he therefore desires that the present disclosure shall be construed as merely showing one set of elements from which the combination can be formed.

Having described the invention what is claimed as new is:

1. A machine for measuring the length of a power transmission belt while operating under a predetermined tension, comprising, in combination, an elongated framework, a bearing block carried thereby and movable therealong, means for interconnecting the bearing block and the framework at predetermined points along the latter, a support secured to the framework near one end thereof, means for moving the support in the direction of the length of the framework, a bearing block carried by the support and movable therealong in the direction of the length of the framework, a pulley associated with the second named bearing block and mounted for rotation about an axis parallel with the axis about which the first mentioned pulley rotates, means comprising a motor for rotating one of the pulleys, the two pulleys serving as a support for a belt which can be put under tension by moving the support, means interposed between the support and the said second bearing block for measuring the value of the tension to which the belt is subjected, and means comprising one member secured to the framework and another member secured to the bearing block carried by the movable support for measuring the length of the belt at any tension to which it is subjected.

2. A machine for measuring the length of a power transmission belt while operating under a predetermined tension comprising, in combination, an elongated framework, a bearing block carried thereby and movable therealong, means for interconnecting the bearing block and the framework at predetermined points along the latter, a support secured to the framework near one end thereof, means comprising a screw and a cooperating nut for moving the support in the direction of the length of the framework, a bearing block carried by the support and movable therealong in the direction of the length of the framework, a pulley associated with the second named bearing block and mounted for rotation about an axis parallel with the axis about which the first mentioned pulley rotates, means comprising a motor for rotating one of the pulleys, the two pulleys, serving as a support for a belt which can be put under tension by moving the support, means interposed between the support and the said second bearing block for measuring the value of the tension to which the belt is subjected, and means comprising one member secured to the framework and another member secured to the bearing block secured to the movable support for measuring the length of the belt at any tension to which it is subjected.

3. A machine for measuring the length of a belt while under tension, comprising, an elongated frame, a bearing block mounted on the frame and movable along the latter, means for interlocking the bearing block and the frame, a pulley carried by the bearing block and mounted for rotation about an axis, a second bearing block mounted on the frame near one end thereof, a pulley movably carried by the second block and mounted for rotation about an axis parallel to the axis of the other pulley, the pulleys being adapted to receive a belt, means for moving the pulleys relative to each other for the purpose of putting the belt under tension, means for indicating the length of the belt, and means comprising a scales mechanism interposed between the second block and the pulley carried thereby for measuring the tension to which the belt is subjected.

4. A machine for measuring the length of a belt while under tension, comprising, in combination, an elongated frame, a bearing block carried by the frame and movable therealong, means for interlocking the block and frame at predetermined points, a pulley carried by the bearing block and mounted for rotation, means for rotating the pulley about its axis, a supporting block secured to the other end of the frame, an intermediate supporting block slidably connected with the supporting block means for moving the intermediate block relative to the supporting block, a bearing block movably connected with the intermediate block, a scales mechanism interposed between the intermediate block and the bearing block, a pulley carried by the last named bearing block and mounted for rotation about an axis parallel with the axis of the first pulley, the two pulleys being adapted to receive an endless belt to be tested, and a measuring device comprising a part secured to the frame and another part secured to the last named bearing block.

5. A machine for measuring the length of a belt while under tension, comprising an elongated frame, a bearing block mounted on the frame and movable along the latter, means for interlocking the bearing block and the frame, a pulley carried by the bearing block and mounted for rotation about an axis, a second bearing block mounted on the frame near one end thereof, a pulley carried by the second block and mounted for rotation about an axis parallel with the axis of the first pulley, the pulleys being adapted to receive a belt, means for rotating the first mentioned pulley, means for moving the pulleys relative to each other for the purpose of putting the belt under tension, a scales mechanism interposed between the pulley on the second mentioned bearing block and the moving means for measuring the tension in the belt, and means for indicating the length of the belt, at any predetermined tension.

CHARLES C. GATES.